(12) United States Patent
Hackl et al.

(10) Patent No.: US 11,170,605 B2
(45) Date of Patent: Nov. 9, 2021

(54) METHOD FOR DETECTING AT LEAST ONE GAMBLING CHIP OBJECT

(71) Applicant: Revolutionary Technology Systems AG, Lucerne (CH)

(72) Inventors: Eberhart Hackl, Dornbirn (AT); Markus Eberhard, Lindau (DE); Christoph Muxel, Hard (AT)

(73) Assignee: Revolutionary Technology Systems AG, Lucerne (CH)

( * ) Notice: Subject to any disclaimer, the term of this patent is extended or adjusted under 35 U.S.C. 154(b) by 156 days.

(21) Appl. No.: 16/488,637

(22) PCT Filed: Feb. 19, 2018

(86) PCT No.: PCT/EP2018/054042
§ 371 (c)(1),
(2) Date: Aug. 26, 2019

(87) PCT Pub. No.: WO2018/054042
PCT Pub. Date: Aug. 26, 2019

(65) Prior Publication Data
US 2021/0142610 A1    May 13, 2021

(30) Foreign Application Priority Data

Feb. 27, 2017    (AT) .................................. A 69/2017

(51) Int. Cl.
*G06T 7/90* (2017.01)
*G07F 17/32* (2006.01)
(Continued)

(52) U.S. Cl.
CPC .............. *G07F 17/322* (2013.01); *G06T 7/70* (2017.01); *G06T 7/90* (2017.01); *G07F 17/3206* (2013.01);
(Continued)

(58) Field of Classification Search
CPC ..... G07F 17/322; G07F 17/3241; G06T 7/70; G06T 7/90; G06T 7/97
See application file for complete search history.

(56) References Cited

U.S. PATENT DOCUMENTS 4,814,589 A * 3/1989 Storch ..................... G06F 11/14
235/375
5,216,234 A * 6/1993 Bell ......................... G06K 7/14
194/214

(Continued)

FOREIGN PATENT DOCUMENTS

SG    178788    3/2012
WO    9720605    6/1997

(Continued)

OTHER PUBLICATIONS

Blank, Christian, "Generatio of depth images through stereoscopy", Hochschule Fur Angewandte Wissenschaftern Hamburg, Hamburg University of Applied Sciences, 70 pages, http://edoc.sub.uni-hamburg.de/haw/volltexte/2013/2171/pdf/bachelorthesis.pdf., 70 pages, Feb. 2013.

(Continued)

*Primary Examiner* — Steven J Hylinski
(74) *Attorney, Agent, or Firm* — Volpe Koenig (57) ABSTRACT

A method for detecting at least one gambling chip object (2, 3), consisting of one gambling chip (1) or a plurality of gambling chips (1) stacked on top of each other in a detection area (4) on a surface (5) of a gambling table (6), wherein in each case at least one 2-dimensional image of the detection area (4) on the surface (5) of the gambling table is recorded with at least two cameras (7, 8) of at least one camera unit (9) which are arranged in different positions over the surface (5) of the gambling table. At at least one data record with at least one point cloud (10, 11) that is made from data points (12, 13, 14) which map the gambling chip (Continued)

object (2, 3) is generated from these two-dimensional images, and each data point (12, 13, 14) is assigned three spatial coordinates.

11 Claims, 5 Drawing Sheets

(51) Int. Cl.
 *G06T 7/70* (2017.01)
 *H04N 5/247* (2006.01)
(52) U.S. Cl.
 CPC ......... *G07F 17/3241* (2013.01); *H04N 5/247* (2013.01); *G06T 2207/10024* (2013.01)

(56) References Cited

U.S. PATENT DOCUMENTS

| | | | |
|---|---|---|---|
| 5,283,422 A * | 2/1994 | Storch | G06F 11/14 235/375 |
| 5,356,140 A | 10/1994 | Dabrowski et al. | |
| 5,393,067 A | 2/1995 | Paulsen et al. | |
| 5,586,936 A | 12/1996 | Bennett et al. | |
| 5,605,334 A | 2/1997 | McCrea, Jr. | |
| 5,651,548 A | 7/1997 | French et al. | |
| 5,743,798 A | 4/1998 | Adams et al. | |
| 5,757,876 A * | 5/1998 | Dam | G06M 1/101 377/14 |
| 5,781,647 A * | 7/1998 | Fishbine | G07D 9/04 235/375 |
| 5,781,657 A * | 7/1998 | Masuda | G01N 21/95607 382/147 |
| 5,924,926 A | 7/1999 | Brown | |
| 5,941,769 A * | 8/1999 | Order | A63F 1/18 463/12 |
| 5,957,776 A | 9/1999 | Hochne | |
| 6,015,344 A | 1/2000 | Kelly et al. | |
| 6,302,790 B1 | 10/2001 | Brossard | |
| 6,425,817 B1 * | 7/2002 | Momemy | G07D 9/06 453/17 |
| 6,446,864 B1 | 9/2002 | Kim et al. | |
| 6,460,848 B1 * | 10/2002 | Soltys | G06Q 10/0639 273/149 R |
| 6,514,140 B1 * | 2/2003 | Storch | G07F 1/06 463/13 |
| 6,532,297 B1 * | 3/2003 | Lindquist | G07D 9/04 101/493 |
| 6,629,591 B1 | 10/2003 | Griswold et al. | |
| 6,638,161 B2 * | 10/2003 | Soltys | A63F 1/18 273/138.2 |
| 6,948,131 B1 | 9/2005 | Neven et al. | |
| 8,002,619 B2 | 8/2011 | Gagner et al. | |
| 8,016,665 B2 * | 9/2011 | Gururajan | A63F 1/00 463/24 |
| 9,378,766 B2 * | 6/2016 | Kelly | G06K 9/52 |
| 10,650,550 B1 * | 5/2020 | McClellan | G06T 7/11 |
| 10,861,281 B2 * | 12/2020 | Shigeta | G07F 17/3288 |
| 10,957,156 B2 * | 3/2021 | Shigeta | G06K 9/00 |
| 2001/0029200 A1 | 10/2001 | Romero | |
| 2002/0042298 A1 | 4/2002 | Soltys et al. | |
| 2002/0084974 A1 | 7/2002 | Oshima et al. | |
| 2002/0111205 A1 | 8/2002 | Beavers | |
| 2003/0060263 A1 | 3/2003 | Pearce et al. | |
| 2003/0064798 A1 | 4/2003 | Grauzer et al. | |
| 2003/0151198 A1 | 8/2003 | Parra et al. | |
| 2003/0220136 A1 * | 11/2003 | Soltys | G06K 9/6203 463/25 |
| 2003/0232651 A1 | 12/2003 | Huard et al. | |
| 2004/0005920 A1 * | 1/2004 | Soltys | G07F 17/32 463/25 |
| 2004/0009799 A1 | 1/2004 | Breeding et al. | |
| 2004/0077425 A1 | 4/2004 | Goossens et al. | |
| 2004/0224777 A1 | 11/2004 | Smith et al. | |
| 2005/0026680 A1 | 2/2005 | Gururajan | |
| 2005/0051965 A1 | 3/2005 | Gururajan | |
| 2005/0272501 A1 | 12/2005 | Tran et al. | |
| 2006/0019739 A1 | 1/2006 | Soltys et al. | |
| 2006/0068878 A1 | 3/2006 | Krenn et al. | |
| 2006/0160600 A1 * | 7/2006 | Hill | G07F 17/32 463/17 |
| 2006/0160608 A1 * | 7/2006 | Hill | G07F 17/3293 463/25 |
| 2007/0010310 A1 | 1/2007 | Goossens | |
| 2007/0013538 A1 | 1/2007 | Dalzell | |
| 2007/0015583 A1 * | 1/2007 | Tran | G07F 17/3288 463/40 |
| 2007/0077987 A1 | 4/2007 | Gururajan et al. | |
| 2007/0087843 A1 | 4/2007 | Steil et al. | |
| 2007/0296151 A1 | 12/2007 | Kyrychenko | |
| 2008/0026807 A1 | 1/2008 | Moshal et al. | |
| 2008/0113783 A1 | 5/2008 | Czyzewski et al. | |
| 2008/0246219 A1 | 10/2008 | Kyrychenko | |
| 2009/0029756 A1 | 1/2009 | Guest | |
| 2009/0075725 A1 * | 3/2009 | Koyama | G07F 17/32 463/25 |
| 2009/0088243 A1 | 4/2009 | Gagner et al. | |
| 2009/0115133 A1 | 5/2009 | Kelly et al. | |
| 2009/0176547 A1 | 7/2009 | Katz | |
| 2010/0121808 A1 | 5/2010 | Kuhn | |
| 2010/0176553 A1 | 7/2010 | Schmersal | |
| 2011/0127722 A1 | 6/2011 | Emori et al. | |
| 2012/0108308 A1 | 5/2012 | Hong et al. | |
| 2013/0178264 A1 | 7/2013 | Vilpas | |
| 2014/0121015 A1 | 5/2014 | Massing et al. | |
| 2014/0274252 A1 | 9/2014 | Chun | |
| 2017/0161987 A1 * | 6/2017 | Bulzacki | G06K 9/00201 |
| 2018/0247134 A1 * | 8/2018 | Bulzacki | A63F 3/00157 |

FOREIGN PATENT DOCUMENTS

| | | |
|---|---|---|
| WO | 0016863 | 3/2000 |
| WO | 03104021 | 12/2003 |
| WO | 2006124912 | 11/2006 |
| WO | 2007081856 | 7/2007 |
| WO | 2009061618 | 5/2009 |
| WO | 2010077369 | 7/2010 |
| WO | 2016191856 | 12/2016 |

OTHER PUBLICATIONS

Nguyen, Anh et al., "3D Point Cloud Segmentation: A Survey ", 2013 6th IEEE Conference on Robotics, Automation and Mechatronics (RAM), pp. 225-230, Aug. 2013.

Woo, H et al., "A new segmentation method for point cloud data", International Journal of Machine Tools & Manufacture 42 (2002), pp. 167-178, Aug. 2, 2001.

* cited by examiner

METHOD FOR DETECTING AT LEAST ONE GAMBLING CHIP OBJECT

BACKGROUND

The present invention relates to a method for detecting at least one gambling chip object consisting of one gambling chip or multiple gambling chips stacked one on top of the other in a detection area on a playing table surface of a playing table, wherein at least one two-dimensional image of the detection area on the playing table surface is captured by each of at least two cameras of at least one camera unit, the cameras being arranged at different positions above the playing table surface.

In casinos and for various occasions in which various games are conducted using gambling chips, it is of interest to provide an automated method for detecting gambling chip objects consisting of one gambling chip or multiple gambling chips stacked one on top of the other on the playing table surface. Such methods can be used to document and monitor the progress of the game. For example, it is possible to use such a method to monitor that gambling chip objects are not moved or shifted by the players in impermissible ways during the game or impermissibly removed from the playing table surface.

A method according to the class is known, e.g., from US 2005/0026680 A1. The method shown there operates with cameras of an overhead imaging system, in order to detect the position of the gambling chip objects on the gambling table. For detecting the type of gambling chip in the gambling chip object, in US 2005/0026680, a so-called lateral imaging system with cameras arranged just above the playing surface is used.

SUMMARY

The object of the invention is to provide an alternative method of the type specified above, with which the gambling chip objects located in the detection area of the camera unit on the playing table surface of the playing table can be detected.

To meet this objective, for the method according to the invention it is provided that at least one data set with at least one point cloud is generated from data points imaging the gambling chip object from these two-dimensional images, wherein three spatial coordinates are allocated to each data point.

Thus, a basic idea of the invention to convert the two-dimensional images captured by the at least two cameras of the camera unit into one data set with a point cloud, in which three spatial coordinates are allocated to each data point. In other words, according to the invention for detecting the gambling chip objects in the detection area on the playing table surface, at least one three-dimensional data set is generated from two two-dimensional images captured from different positions. To do this, stereoscopy algorithms known from the prior art can be used. The known stereoscopy makes it possible to generate a three-dimensional image of the object from at least two two-dimensional images captured from different positions but imaging the same object. In the present case, this object includes the gambling chip objects arranged in the detection area of the playing table surface. Due to the arrangement of the cameras of the camera unit at different positions above the playing table surface, the detection area is captured from different perspectives or from different points of observation, so that the two-dimensional images of the cameras generated in this way can be used for a stereoscopic evaluation and generation of the data set with the data points each with three spatial coordinates.

The term "gambling chip" is meant to include all known, prior art objects that are used in many different games such as roulette and the like and are placed by the players at certain positions on the playing table surface, in order to be used in the game. The gambling chips could also be called chips, tokens, or markers. The thickness of the gambling chip or its gambling chip lateral surface or, in other words, the gambling chip thickness, is usually significantly smaller than the extent of the gambling chip in the two other spatial directions. The gambling chips often have a coin-like or plate-like shape. In principle, however, they could have a wide range of different gambling chip shapes. The gambling chip thickness preferably should be at least 2 mm for good detectability of the coloring of the gambling chip lateral surface. Through a preferred arrangement of the cameras at an angle above the playing table surface, as will be explained in more detail farther below, the gambling chip lateral surfaces can be preferably easily detected.

A gambling chip object can consist of an individual gambling chip arranged at a certain location on the playing table surface. Often, however, individual gambling chips are also stacked one on top of the other and in this way together form one gambling chip object. In this case, the gambling chip object could also be referred to as a gambling chip stack or a gambling chip cluster, because the gambling chips of a gambling chip object are not necessarily stacked cleanly one on top of the other, but instead, could also be placed one on the other in a cluster and/or arranged tilted or tipped relative to each other. The gambling chip top surfaces, that is, the flat sides of the gambling chips or, in other words, the largest surface extents of the gambling chip, do not all necessarily have to be oriented parallel to each other within the gambling chip object, as is the case for a cleanly stacked gambling chip stack. The gambling chip object comprises, in the case of multiple gambling chips, all those gambling chips on the playing table surface that are physically either directly in contact with each other or in contact via the intermediate contact of other gambling chips of the respective gambling chip object. Of course, there can also be multiple different gambling chip objects arranged spaced apart from each other on the playing table surface.

The detection area is the area of the playing table surface that forms the intersecting set of the fields of view of the cameras of the camera unit on the playing table surface. In other words, it is the area of the playing table surface that is viewed by both cameras and can be imaged in the two-dimensional images of the cameras.

The playing tables and the playing table surfaces can be constructed as is known in the prior art. They could be, e.g., a roulette table with a corresponding playing table surface or the like.

The method according to the invention is preferably a digital method that is performed at least partially on a data processing device. The two-dimensional images of the cameras are preferably digital images from the beginning. In particular, the data set with the at least one point cloud is preferably generated digitally from the data points imaging the gambling chip object.

The term "point cloud" means a plurality of data points of the data set, wherein the data points in the point cloud are spaced apart from each other, that is, have different spatial coordinates. The resolution, that is, the spatial distance of the individual data points to each other in the point cloud is selected in a suitable way under consideration, in particular, of the resolution of the two-dimensional images of the cameras, the sizes of the gambling chips and the detection area, and the geometry of the arrangement of the cameras.

The same game state should be imaged by the cameras of the camera unit. To ensure this, preferred variants of the invention provide that the two-dimensional images from which the data set is generated are captured by the cameras of the camera unit simultaneously, that is, in other words, time-synchronized.

To be able to produce the best possible images of both the gambling chip top surfaces and also the gambling chip lateral surfaces of the gambling chips of the gambling chip object, the cameras of the camera unit should each be directed with a perspective at an angle from above onto the detection area of the playing table surface for capturing the two-dimensional images. In other words, the cameras should have two viewing angles or viewing directions that are different from each other and are arranged at an angle above the playing table surface onto the detection area of the playing table surface. The term "at an angle" here describes an arrangement at an acute angle, that is, neither parallel nor perpendicular to the playing table surface or to its detection area. This can but does not have to be achieved such that the cameras of the camera unit are arranged one above the other.

The method according to the invention is preferably performed not only digitally but also automatically and/or in real time. Terms such as top, bottom, and/or lateral refer to the normal operating position of the playing table in which the gambling chip objects are arranged on the playing table surface.

If the method according to the invention is used for detecting gambling chip objects that can consist of different kinds of gambling chips, then preferred variants of the invention provide that color information is also allocated to each data point in addition to the three spatial coordinates. Here, it is exploited that in the prior art, gambling chips of different types or with different values are marked by optically distinguishable coloring. These could be both single-color gambling chips, wherein different colors are allocated to different types of gambling chips. It would be just as good, however, if each gambling chip has a multi-color construction, wherein the different types or values of the gambling chips can then be detected from the different color combinations of the gambling chips. All this can be detected and evaluated with preferred embodiments of the method according to the invention, if color information is allocated to each of the data points. The color information can basically have different constructions. For example, it could be a simple specification of colors, such as red, blue, green, optionally correspondingly coded, or the like. Preferably, color information that is allocated to each data point is used, e.g., so-called color coordinates in a color space. Here, different color spaces and their color coordinates known in the prior art, e.g., the RGB color space, the HSV color space, or the CIELAB color space can be used. Determining color coordinates for data points in an image is known.

For determining the position and orientation of each gambling chip in the gambling chip object, in preferred embodiments of the invention, at least one previously known gambling chip shape is, optionally several times, fit into the point cloud. This works in methods according to the invention both when all gambling chips have the same gambling chip shape and also when the gambling chip objects are formed from differently shaped gambling chips, that is, from gambling chips with different gambling chip shapes. If multiple gambling chip shapes are fit into the point cloud, then this gives, in addition to the indication of the position and orientation of each gambling chip, also the number of gambling chips in the gambling chip object. The process of fitting is also called mapping. For this fitting or mapping, different algorithms known in the prior art can be used. Preferred variants of algorithms for this purpose will be explained as examples in the description of the figures. If the type or value of each gambling chip is also to be determined, then, in preferred embodiments, as already explained above, the color information is evaluated for this purpose.

In one preferred embodiment of the method according to the invention, it is provided that for determining the position and orientation of each gambling chip in the gambling chip object, at least one flat top surface is determined in the point cloud and a surface normal perpendicular to this top surface is calculated. In other words, for this purpose, at least one flat area in the form of at least one flat top surface is sought in the point cloud, which reproduces, at least in some areas, the gambling chip surface of a gambling chip in the gambling chip object. These top surfaces are, e.g., completely or partially circular, if the gambling chips are shaped like coins or in the form of flat cylinders. These flat top surfaces, however, could also have a rectangular or differently constructed shape in some areas, if the gambling chips are constructed accordingly. Because the gambling chips of a gambling chip object might be partially hidden, these flat top surfaces are not necessarily always the entire gambling chip top surface. The term "surface normal" is to be understood in the mathematical sense. It is a direction that is perpendicular or orthogonal, that is, normal to the top surface viewed from all sides.

Other preferred variants of the method according to the invention provide that the area of the point cloud between the top surface and the playing table surface is divided along the surface normal into a sequence of object layers, wherein the layer boundary surfaces bordering each object layer are defined parallel to the top surface and the layer thickness of each object layer, measured along the surface normal, is defined corresponding to the previously determined gambling chip thickness of an individual gambling chip. The object layers can also be called point layers. They comprise all the points of a point cloud of the data set generated from the two-dimensional images of the cameras that are arranged spatially between the layer boundary surfaces. The position of the layer boundary surfaces is given from the previously determined gambling chip thickness of the individual gambling chips, which is taken away in the direction of or along the surface normal for determining the layer boundary surfaces. The uppermost layer boundary surface is the top surface. Underneath that, that is, in the direction of the surface normal in the direction toward the playing table surface, if the gambling chip object consists of a single gambling chip, there is a single additional layer boundary surface, which lies on the playing table surface. If the gambling chip object consists of multiple gambling chips stacked one on top of the other, then a corresponding number of object layers and layer boundary surfaces is produced. The determination of the sequence of object layers conducted in this way is processed preferably starting from the top surface from the top to bottom, that is, in the direction toward the playing table surface along the surface normal. If the gambling chip object consists of a single gambling chip, then the sequence of object layers also consists of only a single object layer. If the gambling chip object is a gambling chip stack, then the sequence of object layers has a corresponding number of object layers. The gambling chip thickness and the gambling chip shape can be determined in advance by a corresponding imaging or measuring of the gambling chip, which can then be used as an input parameter for this type of evaluation.

Then it is preferably provided that, for each object layer, a two-dimensional projection is calculated in the direction of the surface normal to the layer boundary surface of the respective object layer facing away from the playing table surface. The two-dimensional projection in the direction of the surface normal is, in other words, a top view of the respective object layer in the direction along the surface normal. In the object layer representing the uppermost gambling chip, the layer boundary surface facing away from the playing table surface is the top surface.

Then it is preferably provided that a previously known gambling chip shape is fit into the two-dimensional projection and all data points of the object layer that lie in the fitted gambling chip shape are allocated to an individual detection object reproducing a gambling chip. The detection object can thus be viewed as a digital image of the real and physical gambling chip shape, position, and orientation of each gambling chip in the gambling chip object. The gambling chip shape is here, as already mentioned above, previously determined using the gambling chip actually used for the game and used as an input parameter for this processing step.

If the method also comprises a color evaluation for determining the type or value of the respective gambling chip, then it is preferably provided that the type of each gambling chip is determined from the color information of the data points allocated to the detection object.

In addition to the method, the invention also relates to an arrangement with a playing table with a playing table surface that has a detection area for at least one gambling chip object consisting of one gambling chip or multiple gambling chips stacked one on top of the other, wherein the arrangement also has at least one camera unit with at least two cameras arranged in different positions above the playing table surface for capturing at least one two-dimensional image and at least one data processing device for processing the two-dimensional images, wherein, according to the invention it is provided that the cameras are each directed onto the detection area for imaging the detection area. In other words, the cameras look at the playing table surface from different directions. Here, however, together they image a joint detection area. The detection area, as already discussed above, is thus the intersecting set of the fields of view of the cameras on the playing table surface. The fields of view of the cameras can overlap completely or also only partially. If color information is also allocated to the individual data points, at least one of the cameras must be a color camera.

BRIEF DESCRIPTION OF THE DRAWINGS

Other features and details of preferred embodiments of the arrangement according to the invention are given, on one hand, from the above statements on preferred embodiments of the method and, on the other hand, from the following description of the figures.

Schematized features and procedures of preferred variants of the invention are shown in the figures, which will now be explained below. Shown are.

DETAILED DESCRIPTION

Figure 1:
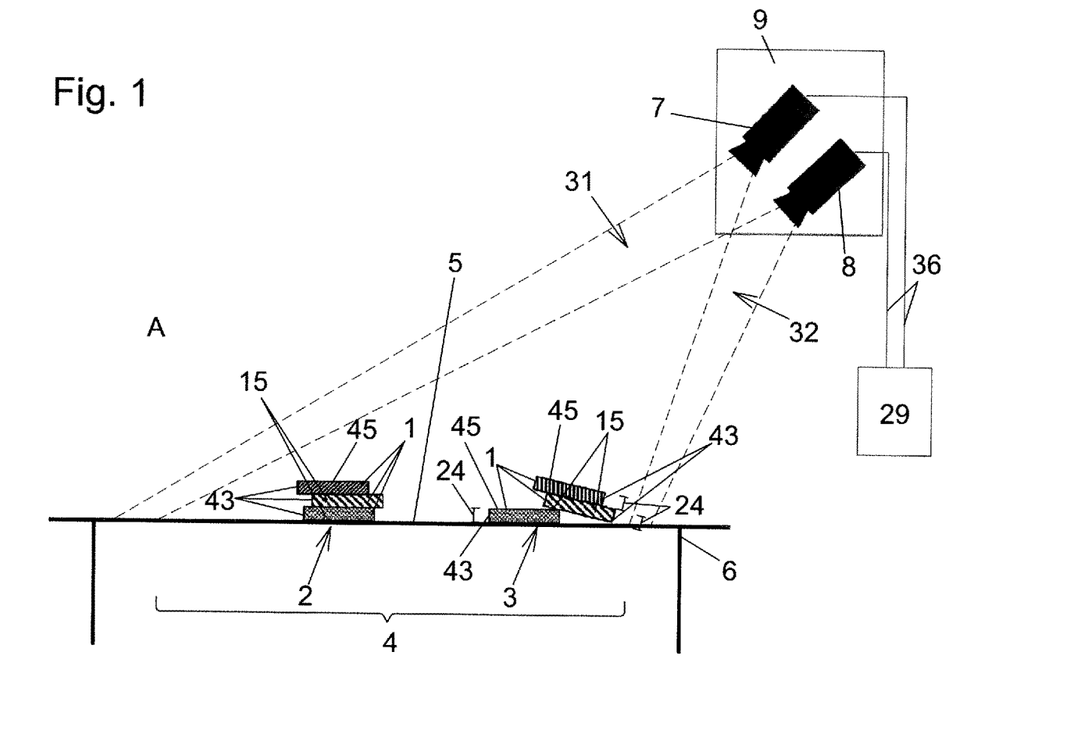
FIG. 1 a schematized representation of a simple example of an arrangement according to the invention.

FIG. 1 shows an arrangement according to the invention with which the method according to the invention can also be performed. It has a playing table 6, e.g., a roulette table or the like, with a corresponding playing table surface 5. The entire playing table surface 5 or only a part of it forms the detection area 4, in which two gambling chip objects 2 and 3 are arranged as examples in FIG. 1. Both gambling chip objects 2 and 3 of the example shown here consist of gambling chips 1 stacked one on top of the other. In particular, the gambling chip object 3 here shows that the gambling chips 1 of a gambling chip object 2, 3 do not have to be stacked cleanly one on top of the other, but also can be arranged partially covering and/or tilted or tipped relative to each other. A gambling chip object 2 or 3 is produced from the number of gambling chips 1 that are in direct physical contact with each other or in contact by the intermediate positioning of other gambling chips 1 of the respective gambling chip object 2, 3. As already explained above, a gambling chip object 2, 3 can also consist of an individual gambling chip 1, if this is lying isolated on the playing table surface 5.

The arrangement according to the invention also has at least one camera unit 9 that has, in turn, at least two, in the shown embodiment, exactly two, cameras 7 and 8 arranged at different positions above the playing table surface 5 so that each camera can capture at least one two-dimensional image. The cameras 7 and 8 are in data connection, via the symbolically drawn data lines 36, with the data processor device 29 that performs the computational steps necessary for implementing the method according to the invention and that also then stores the data accordingly. The cameras 7, 8, the type of data connection, the data processor device 29, the playing table 6, and the gambling chips 1 can be conventional, commercially available products.

The two cameras 7 and 8 are each directed onto the detection area 4 for imaging the detection area 4. In other words, the detection area 4 on the playing table must be in each field of view 31 and 32 of the cameras 7 and 8, respectively. The detection area 4 of the camera unit 9 is the intersecting set of the fields of view 31 and 32 on the playing table surface 5. With the method according to the invention, only those gambling chip objects 2 and 3 can be detected and identified that are in the detection area 4. The cameras 7 and 8 of the camera unit 9 are each directed with a perspective from above at an angle onto the detection area 4 of the playing table surface 5. In the shown embodiment, the cameras 7 and 8 of the camera unit 9 are arranged one above the other. If, for the implementation of the method according to the invention or a preferred embodiment, the color information is also allocated to each data point 12, 13, 14, then at least one of the two cameras 7 and 8 must be a color camera, that is, a camera that can image and reproduce color information. The cameras 7 and 8 are preferably high-resolution, digital 2D cameras. The resolution should be preferably at least 5 Megapixels for each camera 7, 8. To be able to cover larger playing table surfaces 5 or to be able to analyze the detection area 4 from different perspectives, multiple camera units 9 can also be used together, wherein each camera unit 9 has, in turn, at least two cameras 7 and 8 that are arranged at different locations. Multiple camera units 9 can also be used for increasing the detection accuracy.

The gambling chips 1 that form the different gambling chip objects 2 and 3 can have a coin-shaped form or can also have a different gambling chip shape 15. The gambling chip thickness 24 of the gambling chip lateral surface 43 and the size and shape of the gambling chip top surface 45 and the orientation of these outer surfaces of each gambling chip 1 relative to each other together form its gambling chip shape 15. The gambling chips 1 can have different colors or color compositions as already explained above, which is indicated in FIG. 1 by the different cross-hatching.

Figure 2:
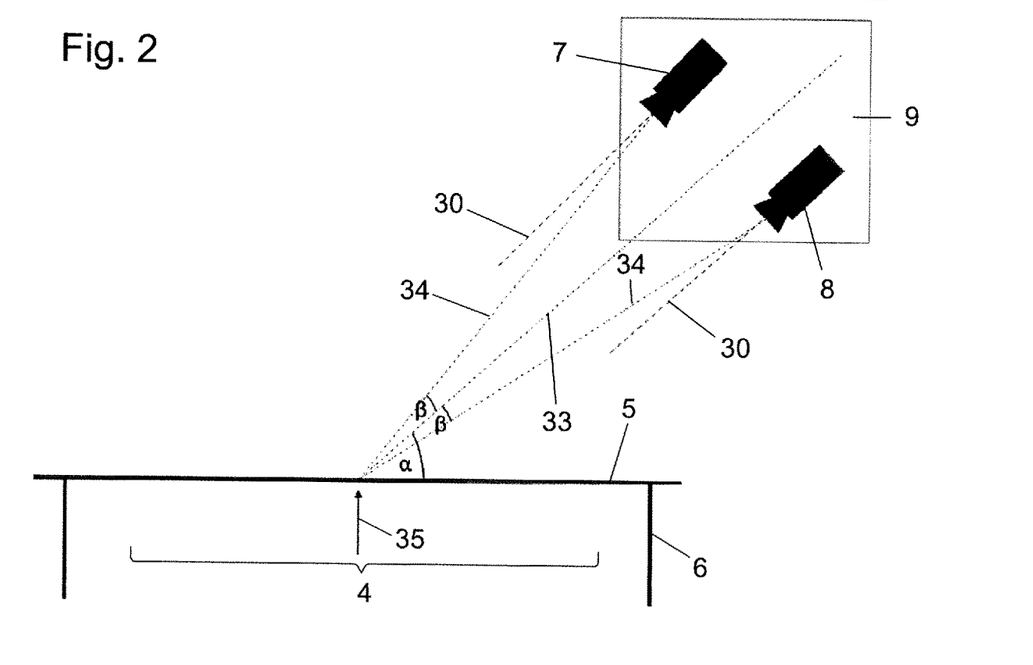
FIG. 2 a schematic drawing for explaining preferred types of the arrangement of the cameras of a camera unit above the playing table.

With reference to FIG. 2, preferred shapes of the arrangement of the cameras 7 and 8 of the camera unit 9 relative to each other and relative to the detection area 4 or the playing table surface 5 will now be explained. In principle, it must also be noted that the distance between the two cameras and also the distance between the cameras 7 and 8 and the playing table surface 5 have different shapes in certain limits and can be adapted to the spatial options present on site and also to the resolution of the cameras 7 and 8. In general, however, it is important in any case that the cameras 7 and 8 of a respective camera unit 9 with different fields of view 31 and 32 or from different directions are directed from above at an angle onto the playing table surface 5 or the same detection area 4. To achieve this, the two cameras 7 and 8 of a camera unit 9, as sketched in FIG. 2, can be oriented with respect to an imaginary system center axis 33 that encloses, starting from the center 35 of the detection area 4 with the playing table surface 5, an angle α preferably from 35° to 55°. The cameras 7 and 8 are then preferably mounted on imaginary camera mount axes 34 that have, in the way shown in FIG. 2 with the system center axis 33, a camera mount angle β preferably in the range from 2° to 10°. The optical axes 30 of the cameras 7 and 8, however, do not have to be directed toward the center 35 of the detection area 4. The optical axes 30 are usually the central axes of the respective field of view 31, 32 of the respective camera 7, 8. It is preferred, however, if the optical axes 30 of the cameras 7 and 8 of a camera unit 9 span a plane that is arranged at least approximately vertical, that is, preferably encloses an angle of maximum 10°, especially preferred of maximum 5°, with the vertical. The two cameras 7 and 8 of a camera unit 9 can be arranged one directly above the other. However, it is also just as good to shift one of the two cameras 7 and 8 of the camera unit 9 relative to the other along the respective camera mount axis 34, so that the cameras 7, 8 are no longer arranged one directly above the other.

Both cameras 7 and 8 should be arranged, in any case, so that they can identify or detect as best as possible both the gambling chip top surfaces 45 and also the gambling chip lateral surfaces 43 of the gambling chips 1 of the gambling chip objects 2, 3 arranged in the detection area 4.

It was already explained above that the common two-dimensional images to be evaluated are captured simultaneously or, in other words, time-synchronized. This is preferably already supported by the camera hardware.

Before the process of detecting the gambling chips 1 of the gambling chip objects 2, 3 in the detection area 4 on the playing table surface 5 begins, for configuring the system, the gambling chip shape 15, that is, in particular, the gambling chip top surface 45, the gambling chip lateral surface 43, and the gambling chip thickness 24 of the gambling chips 1 being used should be determined and made available to the system or to the data processing device 29. If there are different types of gambling chips and if the color information is also to be evaluated for determining the type of gambling chips 1, then the colors used for the respective types of gambling chips 1 must also be imaged, in order to generate reference colors and store them in the system. In addition, the geometry of the playing table surface 5 and of the cameras 7 and 8 of all camera units 9 relative to the playing table 6 usually must also be imaged and provided to the system. If multiple camera units 9 are used, usually corresponding coordinate transformations must be calculated so that the two-dimensional images captured by the different camera units 9 can be transferred accordingly into one coordinate system.

With the arrangement explained now as an example using FIGS. 1 and 2, the method according to the invention and its preferred embodiments can be performed. For determining the position, orientation, number, and type of gambling chips 1 in the respective gambling chip objects 2, there are basically different possibilities according to the invention for the procedure. Below, the sequence will be described for one especially preferred method variant.

The following description, as shown in the schematic FIG. 1, assumes, for example, a camera unit 9 with two cameras 7 and 8 and two gambling chip objects 2, 3. The procedure for multiple camera units 9 and/or for other game situations is analogous to that shown in FIG. 1.

Figure 3:
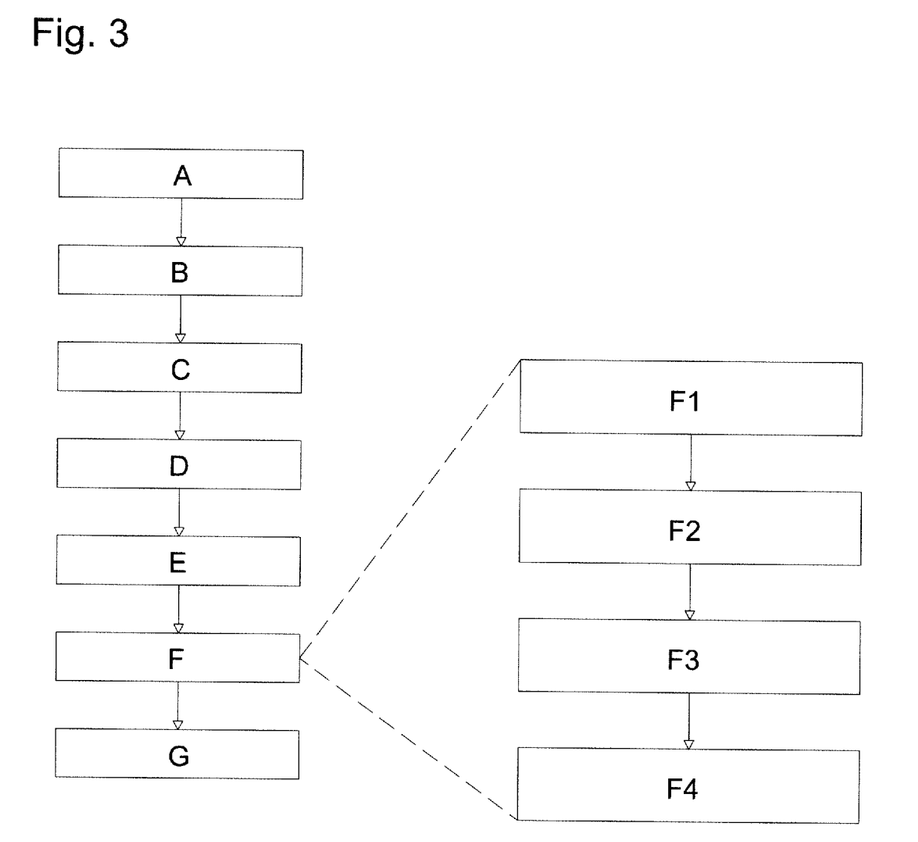
FIG. 3 a flowchart of a preferred variant of the method according to the invention, and FIGS. 4 to 6 schematic representations for illustrating individual steps of this preferred embodiment of the method according to the invention.
Figure 4:
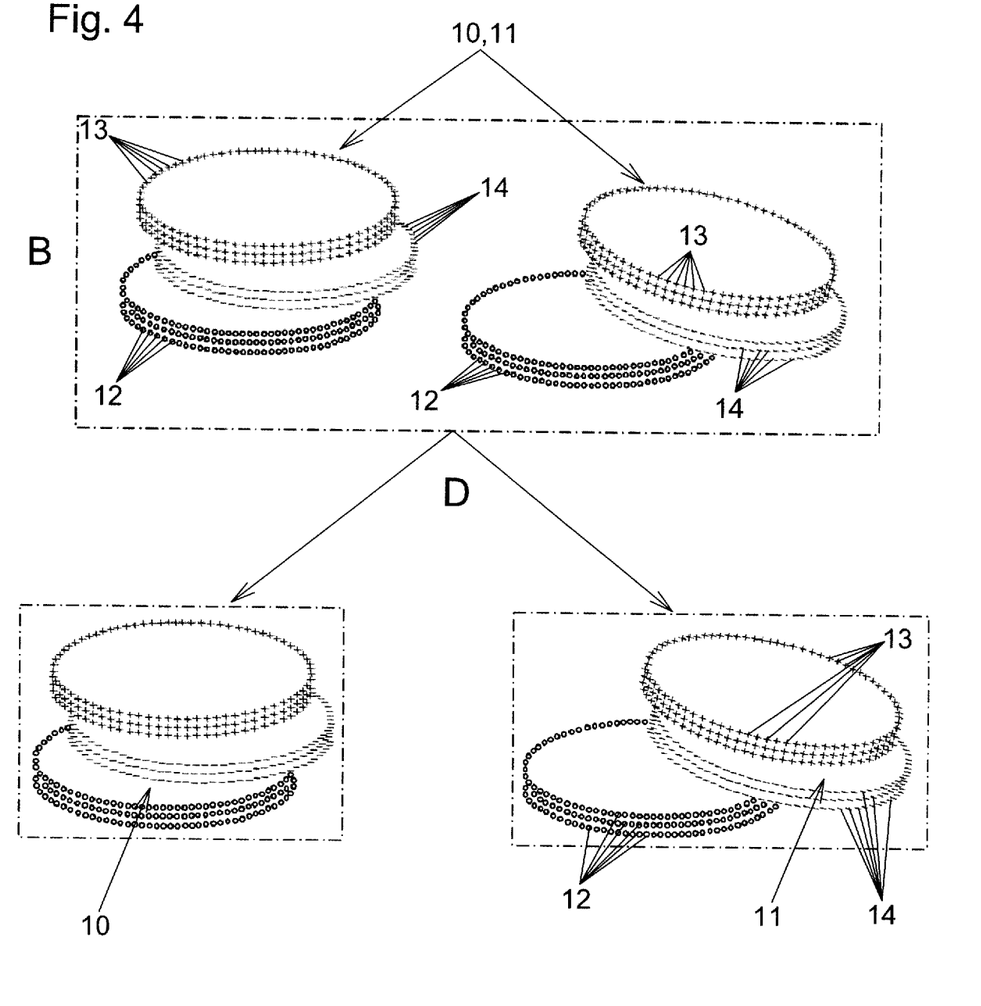
Figure 5:
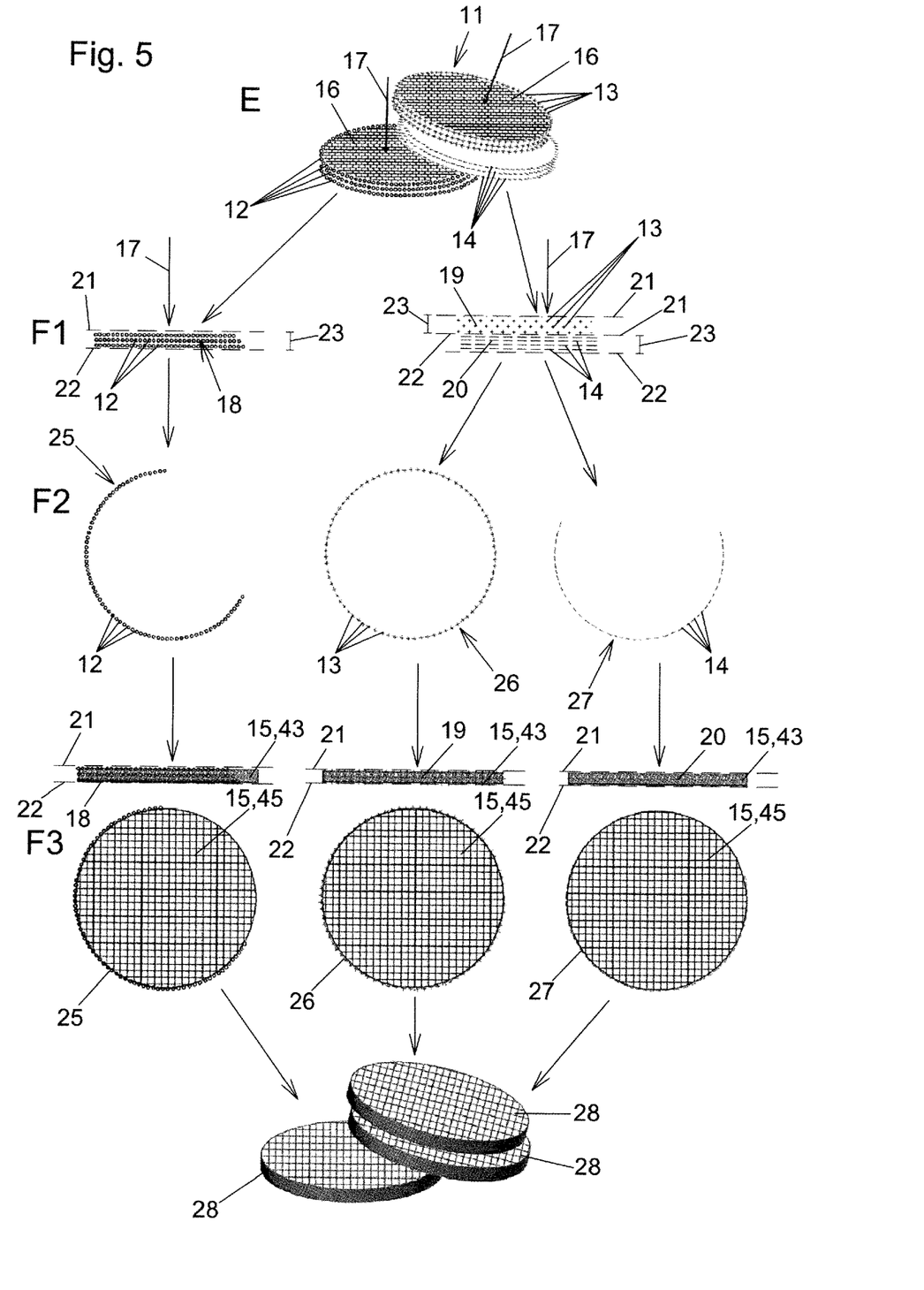
Figure 6:
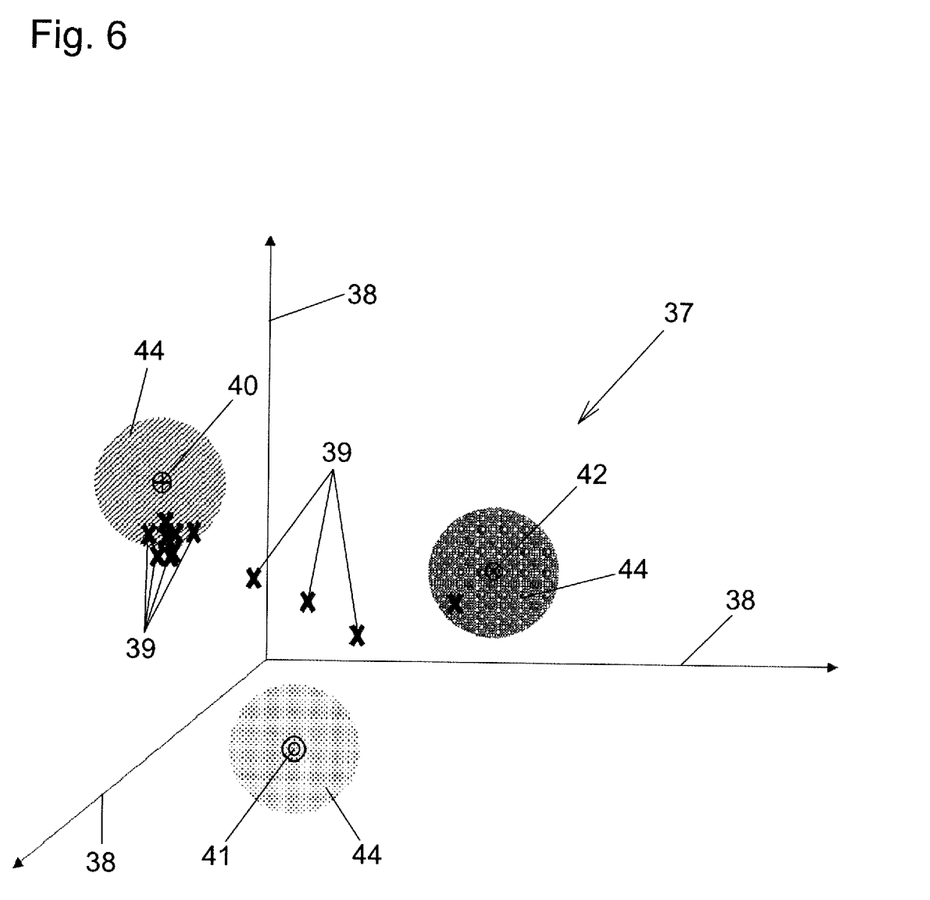

FIG. 3 shows a flowchart for the procedure described below divided into the processing steps A to G, wherein the processing step F is divided even further into the sub-steps F1 to F4. FIGS. 4 to 6 show schematized auxiliary drawings for the individual method steps. FIGS. 3 to 6 will be explained jointly below.

In processing step A, the preferably simultaneous imaging of the two-dimensional images of the detection area 4 with the gambling chip objects 2 and 3 arranged therein is performed by means of the cameras 7 and 8 of the camera unit 9, that is, from different viewing directions or perspectives. These two-dimensional images are transmitted via the data lines 36 of the data processing device 29 for performing the subsequent processing steps. For the preferred variant shown here, in which the color information is also captured and evaluated for determining the type of gambling chip 1, at least one of the two cameras 7 and 8 creates a color image and transmits this to the data processing device 29.

In processing step B, the at least one data set according to the invention is now generated from the previously imaged two-dimensional images of the cameras 7 and 8 from the detection area 4 and the two gambling chip objects 2 and 3 arranged here as an example. This data set is generated, as already explained above, in the form of a stereoscopic evaluation of the at least two two-dimensional images. The data set with the at least one point cloud 10 and 11 is generated from the data points 12, 13, 14 imaging the gambling chip objects 2 and 3, wherein three spatial coordinates are allocated to each data point 12, 13, 14. This stereoscopic generation of the data set is performed for each camera unit 9 on the basis of the two-dimensional images generated with the cameras 7 and 8 with the help of algorithms known in the prior art. For example, so-called block matching algorithms, like those that can be downloaded from the Internet, can be used. The point clouds 10 and 11 generated in this way is a set of spatially distributed data points 12, 13, 14 each with three spatial coordinates that coarsely describe the gambling chip objects 2, 3 to be detected or imaged in their outer contour. In the preferred variant described here for the method according to the invention, color information is also allocated to each data point 12, 13, 14. Accordingly, processing step B could also be designated so-called block matching or stereoscopic data generation.

FIG. 4 shows schematized an example illustration of the data set generated in processing step B. The initially still common point clouds 10 and 11 in this variant consists of a plurality of data points 12, 13, and 14 that image the two gambling chip objects 2 and 3 shown in FIG. 1. Each of the data points 12, 13, and 14 has three spatial coordinates and color information. The color information is purely shown symbolically for illustration in FIG. 4 and the following figures in the form of circles, dashes, and plus signs. The color information can be, as already explained above, colors, but also color coordinates 39 in color spaces 37. The data points reproducing an individual gambling chip 1 could theoretically all have the same color information, if this gambling chip 1 has a single-color construction. Even for single-color gambling chips 1, however, shadows produce areas with different illumination intensities and light, but there is also usually, in practice, a certain variance in the color information that is allocated to the individual data points 12, 13, and 14. If it is, as is often typical, gambling chips 1 that have differently colored areas on their gambling chip top surface 45 and/or gambling chip lateral surface 43, the data points 12, 13, and 14 allocated to each gambling chip 1 naturally also have different color information for a single gambling chip 1 and thus also color coordinates. In the schematic drawings of FIGS. 4 and 5 shown here, for the sake of simplicity, only a single symbol in the form of a +, −, or a circle was allocated to the data points 12, 13, and 14 imaging the one individual gambling chip 1, in order to symbolize the color information.

The subsequent processing steps C to G from FIG. 3 are optional processing steps that can be performed as described below, but also in other ways.

In processing step C, a so-called table transformation is performed. Here, the spatial coordinates of the data points 12, 13, and 14 are rotated by a corresponding transformation matrix, as is known in the prior art, in a Cartesian coordinate system, so that the X-axis and Y-axis of the coordinate system lies in the playing table surface and the Z-axis points vertically upward from the playing table surface.

In processing step D, a so-called cluster segmentation is performed. This could also be called group or object segmentation. The goal is to divide the previously common point cloud 10, 11 into individual point clouds 10 and 11 so that each point cloud 10 and 11 only images one gambling chip object 2 and 3, respectively. This is shown schematized in the lower half of FIG. 4. In this processing step D, thus the original coherent point cloud 10 and 11, which has imaged all gambling chip objects 2 and 3 in the detection area 4, is broken down into individual point clouds 10 and 11, which then each only images one of the gambling chip objects 2 and 3. The point clouds 10 and 11 generated in this way each image only coherent gambling chip objects 2 and 3, in which the gambling chips 1 directly or indirectly contact each other via other gambling chips 1 of the respective gambling chip object 2 or 3.

In FIG. 4 at the bottom, schematized accordingly, the point cloud 10 representing the gambling chip object 2 from FIG. 1 is shown separate from the point cloud 11 representing the gambling chip object 3. For this cluster segmentation, simple algorithms, e.g., Euclidean Cluster Extraction or distance-related cluster extraction could be used.

With reference to processing steps E and F, a preferred procedure will now be described for how the position and orientation of each gambling chip 1 in a gambling chip object 2 or 3 and thus ultimately also the number of gambling chips 1 in each gambling chip object 1 or 3 can be determined. In principle, this works by means of the comparison with a previously known or determined gambling chip shape 15.

In processing step E, for this purpose, initially flat areas in the form of top surfaces 16 are determined in the respective point cloud 11 and a surface normal 17 perpendicular to the respective top surface 16 is calculated. For illustration, refer to the area marked with E in FIG. 5 at the top. There, the point cloud 11 representing the gambling chip object 3 from FIG. 1 is shown as an example, as produced from the processing step D. The flat top surfaces 16 are shown patterned in FIG. 5 for better identification. For determining the top surfaces 16, known algorithms can also be used. For example, a so-called Hough transformation can be performed to look for correspondingly flat areas in the point cloud 11. If the top surfaces 16 are calculated accordingly, the surface normals 17 to the top surfaces can also be calculated. The orientation of the top surfaces 16 and the surface normals 17 allocated to it produces the orientation of the underlying gambling chip 1 in the point cloud 11. The point cloud 11 shown in FIG. 5 has, for example, two top surfaces 16. For determining the top surfaces 16 in the point cloud 10 and the subsequent processing steps, a corresponding procedure is followed, without this being shown here.

After determining the top surfaces 16 and the respective surface normals 17, as the next processing step F, the so-called gambling chip mapping or token mapping is performed. This is divided in FIG. 3 into the individual processing steps F1 to F4. The processing steps F1 to F4 are also shown schematized in FIG. 5.

In sub-step F1, the so-called object layer generation, the area of the point cloud 11 lying between a respective top surface 16 and the playing table surface 5 is divided into a sequence of object layers 18, 19, 20 along the surface normal 17 allocated to this top surface 16. The layer thickness 23 of the respective object layers 18, 19, and 20, measured in the direction along the surface normal 17, corresponds to the previously determined gambling chip thickness 24 of an individual gambling chip 1. The layer boundary surfaces 21 and 22 bordering the object layers 18, 19, and 20 are defined parallel to the top surface 16. Thus, overall, the area of the point cloud 11 lying between the respective top surface 16 and an underlying top surface 16 or the playing table surface 5 is broken down into parallel layers in the form of object layers 18, 19, and 20, wherein the layer thickness 23 of the respective object layers 18, 19, 20 corresponds to the previously defined gambling chip thickness 24. This process is begun with the uppermost top surface 16, that is, the top surface lying farthest away from the playing table surface 5. In the example shown in FIG. 5, this is the top surface 16 that borders the data points 13 toward the top. This produces, as shown on the right in FIG. 5, exactly two object layers 19 and 20 under this top surface 16, which are each bordered by the layer boundaries 21 and 22. The upper layer boundary 21 of the object layer 19 coincides with the upper top surface 16. The lower layer boundary 22 generated in this way for the lower object layer 20 intersects the lower top surface 16 of the object layer 18 lying on the left in the example according to FIG. 5. If there is an overlap of a lower layer boundary surface 22 with an top surface 16 lying farther below, then the breakdown into object layers 18, 19, 20 continues in the direction along its surface normal 17 in an otherwise analogous procedure starting from the top surface 16 lying farther below. This process thus takes place starting from each top surface 16 determined in a point cloud 10, 11 in the direction of the surface normal 17 allocated to it from top to bottom, until either a top surface 16 lying even farther below is intersected or the playing table surface 5 is reached. In the shown embodiment according to FIG. 5, starting from the lower, here left, top surface 16, only one object layer 18 is determined. With its lower layer boundary surface 22, the playing table surface 5 is then reached. If the playing table surface 5 is reached, then the object layer generation for the point cloud 11 is also ended in this embodiment shown in FIG. 5.

If the respective point cloud 11 is then processed completely accordingly and broken down into object layers 18, 19, 20, then the so-called 2D projection of the object layers 18, 19, and 20 is performed as the next partial step F2. For this purpose, for a respective object layer 18, 19, 20, a two-dimensional projection 25, 26, 27 is calculated in the direction of the surface normal 17 on the layer boundary surface 21 of the object layer 18, 19, and 20 facing away from the playing table surface 5 and thus at the top. The corresponding two-dimensional projections 25, 26, and 27 calculated in this way are shown in FIG. 5 in the middle for the selected example. Due to the fact that the gambling chips 1 in the gambling chip object 3 have been placed one on top of the other by the stacking accordingly, only the uppermost two-dimensional projection 26 produces a closed circle, while, for the projections 25 and 27, only the points 12 and 14 visible for the cameras can be used for further evaluation as a result of a non-closed circle.

In sub-step F3, the so-called 2D object mapping, the previously known gambling chip shapes 15 are then fit into the two-dimensional projections 25, 26, and 27 and also between the respective layer boundaries 21 and 22 of the object layers 18, 19, and 20. This fitting can also be called mapping. Here, all data points 12, 13, and 14 of the respective object layer 18, 19, and 20, which lie in the respectively fitted gambling chip shape 15, are allocated to a single detection object 28 reproducing one gambling chip 1. This is shown in FIG. 5 at the bottom and marked in turn with F3. For the sub-step F3, in turn, known algorithms, e.g., the Hough transformation, can be used. For example, processing can be performed with so-called Hough circles. However, there are also other algorithms that can be used here to fit the known gambling chip shape 15 into the two-dimensional projections 25, 26, and 27. In FIG. 5, for this sub-step F3, the result is shown after successful fitting of the gambling chip shape 15 into the 2D projection 25, 26, and 27 in a top view of the gambling chip top surface 45 and also between the layer boundaries 21, 22 in a side view of the gambling chip surface 43.

Then a plausibility check can also be performed in sub-step F4. Here it can be checked, e.g., whether for the calculated position or the calculated area of the one detection object 28, a different detection object 28 was not already calculated. As a result of the chip mapping according to method step F and its sub-steps F1 to F4, the position and orientation and size of the respective detection object 28 is then known. As shown symbolically at the very bottom in FIG. 5, the detection objects 28 then reproduce the position, orientation, and number of gambling chips 1 in the gambling chip object 3 accordingly.

In the example shown in FIG. 5, it is also assumed that all the gambling chips 1 have the same gambling chip shape 15, nevertheless it must be noted that this is not needed for implementing the method described here. For the described procedure, different gambling chip shapes 15 can definitely also be used, and the individual steps can still be performed accordingly, if necessary, iteratively.

Then, if the type or value of the respective gambling chip 1 is also to be determined, the processing step G, the so-called reference gambling chip color mapping or reference chip color mapping can then be performed. For this purpose, the color information of the data points 12, 13, and 14 allocated to the respective detection object 28 is evaluated. In principle, various ways can also be performed. If color information is provided for each data point 12, 13, 14, e.g., color indication such as red, green, blue, white, or the like, then it can be checked, e.g., which colors appear in the data points 12, 13, or 14 of the respective detection object 28, in order to compare this with the coloring of the gambling chip 1.

One preferred variant of the processing step G or the color mapping, that is, the color allocation, however, provides that, as color information on the basis of the at least one color two-dimensional image, color coordinates 39 are allocated to each data point 12, 13, and 14, which refer to a specified color space 37. For the color space 37, generally known color spaces, e.g., the RGB color space, the HSV color space, or also the CIELAB color space can be used. The calculation of color coordinates for these color spaces is generally known and does not need to be discussed here.

The preferred variant of the color mapping or processing step G shown schematized in FIG. 6 provides, in any case, that in a color space with the color space axes 38, initially the reference colors 40, 41, and 42 are recorded with respective tolerance ranges 44. The reference colors 40, 41, and 42 were previously determined on the respective gambling chip 1. For detecting what type of gambling chip 1 is located in the respective detection object 28, the respective color coordinates 39 are then recorded in the color space by all data points 12, 13, 14 allocated to the respective detection object 28. In FIG. 6, this is shown in the shape of a cross as an example, with each representing the position of the three color coordinates of a data point 12, 13, 14 of the respective detection object 28. A statistical evaluation is then performed, so that one of the reference colors 40, 41, and 42 or, for multi-color gambling chips 1, also multiple reference colors 40, 41, and 42 can be allocated to the respective detection object 28, with which the type and value of the gambling chip 1 that was imaged in the respective detection object 28 is then known.

For single-color gambling chips, the statistical evaluation shown in FIG. 6 as an example usually produces a cluster in the area of a single reference color 40 despite the value scattering usually produced by the casting of shadows and different lighting conditions and the like. For multi-color gambling chips 1, their multiple colors can be detected in that the color coordinates 39 of the data points 12, 13, or 14 of one detection object 28 produce clusters for multiple different reference colors 40, 41, 42. For two-color gambling chips 1, a cluster is then produced accordingly for two different reference colors 40, 41, 42, etc. In this type of implementation of the color mapping or the processing step G, the highest statistical hit probability decides which type or value of a gambling chip 1 is allocated to the respective detection object 28.

At the end of the processing step G, both the position and orientation and also the information for what type or value of gambling chip 1 is present are known for each detection object 28. Thus, for corresponding processing of the processing steps, both the position and also the type and value are determined for each gambling chip 1 located in the detection area 4.

LEGEND FOR THE REFERENCE SYMBOLS

1 Gambling chip
2 Gambling chip object
3 Gambling chip object
4 Detection area
5 Playing table surface
6 Playing table
7 Camera
8 Camera
9 Camera unit
10 Point cloud
11 Point cloud
12 Data point
13 Data point
14 Data point
15 Gambling chip shape
16 Top surface
17 Surface normal
18 Object layer
19 Object layer
20 Object layer
21 Layer boundary surface
22 Layer boundary surface
23 Layer thickness
24 Gambling chip thickness
25 2D projection
26 2D projection
27 2D projection
28 Detection object
29 Data processing device
30 Optical axis
31 Layer field
32 Layer field
33 System center axis
34 Camera mount axis
35 Center
36 Data line
37 Color space
38 Color space axis
39 Color coordination
40 Reference color
41 Reference color
42 Reference color
43 Gambling chip edge surface
44 Tolerance range
45 Gambling chip top surface

The invention claimed is:

1. A method for detecting at least one gambling chip object consisting of multiple gambling chips that are physically either directly in contact with each other or in contact via intermediate contact of other gambling chips of the respective gambling chip object in a detection area on a playing table surface of a playing table, the method comprising:
at least two cameras, each capturing at least one two-dimensional image of the detection area on the playing table surface, the at least two cameras being part of at least one camera unit, and the cameras being arranged at different positions above the playing table surface,
generating at least one data set with at least one point cloud made from data points representing the gambling chip object from said two-dimensional images, and
allocating three spatial coordinates to each of said data points, and
for determining a position and orientation of each of said gambling chips in the gambling chip object, whose gambling chips are tilted relative to each other in a gambling chip cluster, determining flat top surfaces in the point cloud and calculating surface normals perpendicular to said top surfaces,
dividing an area of the point cloud between the top surfaces and the playing table surface along the respective surface normal into a sequence of object layers,
defining the layer boundary surfaces bordering the respective object layer parallel to the top surface, and
defining a layer thickness of the respective object layer, measured along the respective surface normal, corresponding to a previously determined gambling chip thickness of an individual gambling chip.

2. The method according to claim 1, further comprising allocating color information to each of said data points.

3. The method according to claim 2, further comprising, for determining a type of each gambling chip (1), evaluating the color information.

4. The method according to claim 1, wherein the two-dimensional images from which the data set is generated are captured simultaneously.

5. The method according to claim 1, further comprising for determining the position and orientation of each said gambling chip in the gambling object, fitting at least one previously known gambling chip shape into the point cloud.

6. The method according to claim 1, further comprising for the respective object layer, calculating a two-dimensional projection in a direction of the surface normal on the layer boundary surface facing away from the playing table surface for each of said object layers.

7. The method according to claim 6, further comprising fitting a previously known gambling chip shape into the two-dimensional projection and allocating all data points the object layer that are in the fitted gambling chip shape to an individual detection object reproducing said gambling chip.

8. The method according to claim 7, further comprising determining a type of each said gambling chip from color information of the data points allocated to the detection object.

9. The method according to claim 1, wherein the cameras of the camera unit are each oriented with a perspective from above and at an angle to the detection area of the playing table surface for capturing the two-dimensional images.

10. The method according to claim 1, wherein the cameras of the camera unit are arranged one above the other.

11. An arrangement for detecting at least one gambling chip object on a playing table with a playing table surface that has a detection area for at least one gambling chip object consisting of multiple gambling chips that are physically either directly in contact with each other or in contact via intermediate contact of other gambling chips of the respective gambling chip object, the arrangement comprising:
at least one camera unit with at least two cameras arranged at different positions above the playing table surface that are configured to capture at least one two-dimensional image from each of said cameras,
at least one data processor configured to process the two-dimensional images by generating at least one data set with at least one point cloud made from data points representing the gambling chip object from said two-dimensional images, and allocating three spatial coordinates to each of said data points, and the cameras for imaging the detection area are each directed toward the detection area and at least one of the cameras is a color camera, and the data processor is configured to determine the position and orientation of the gambling chips in the gambling chip object, whose gambling chips are tilted relative to each other in a gambling chip cluster, by analyzing the point cloud.

* * * * *